FIG:1

INVENTOR.
ROLAND KEMMETMUELLER

United States Patent Office 3,397,678
Patented Aug. 20, 1968

3,397,678
CONTROLS FOR WASTE GAS COOLING STACKS OF METALLURGICAL FURNACES, OF BOF CONVERTERS, OR THE LIKE
Roland Kemmetmueller, Pittsburgh, Pa., assignor to Waagner-Biro AG, Vienna, Austria
Filed May 4, 1967, Ser. No. 636,104
10 Claims. (Cl. 122—7)

ABSTRACT OF THE DISCLOSURE

A cooling stack to be used with a metallurgical furnace, a BOF converter, or the like for receiving waste gases therefrom and for conducting the waste gases away. The cooling stack is of the welded water-tube type, and a circulating means communicates with the tubes of the cooling stack for circulating fluid therethrough. The water-tube walls of the cooling stack have an inner surface directed toward the interior of the stack to be engaged directly by the gases therein and an outer surface directed away from the interior of the stack. A control means coacts with this outer surface of the water-tube walls of the stack for controlling the liquid-gas ratio of the fluid in the water-tube walls.

Background of the invention

The present invention relates to steel-manufacturing plants, and in particular to plants which use BOF (Basic Oxygen Furnace) converters, metallurgical furnaces, or the like.

Thus, the structure of the invention may be used with electric furnaces, open-hearth furnaces, cupola furnaces, and the like, as well as with converters.

As is well known, hot waste gases, rich in carbon monoxide, issue from the top ends of the converters, furnaces, or the like.

In order to convey these waste gases away and to derive energy therefrom, the waste gases are conveyed along the interior of a cooling stack in which the waste gases may be burned, for example, while the water-tube walls of the cooling stack absorb the energy from the gases while simultaneously cooling the same. With installations of this type it is already known to cool the waste gases to such an extent that they can be directed, without the use of water sprays or the like, along waste-gas ducts to dust catchers, scrubbing installations, and the like, where the gases are cleaned, and because of the extent to which it is possible to cool the gases with such units the structure which cleans the waste gases can be made of a relatively small size without any sacrifice in efficiency of the plant. For these reasons it is of considerable advantage to cool the gases by directing cooling liquid in a controlled manner through the tubes of a cooling stack having water-tube walls.

As a result of the transfer of heat to the liquid within these tubes, during the cooling of the gases in the stack, the liquid changes into the gaseous state, so that in this way it is possible, for example, to use the cooling unit also as a steam generator, and considerable economy can be achieved by utilizing the energy stored in the steam which can be generated in this way from the waste gases issuing from the converters.

The fluid can be circulated from the water-tube walls through a steam drum in which the steam accumulates at the upper part of the drum while liquid condensate collects in the lower part of the drum, and this liquid condensate can again be circulated through the water-tube walls of the cooling stack while the steam can be used for any desired purposes such as to operate a turbine of an oxygen-generating installation, for example.

However, certain problems are encountered in practice with installations of this latter type. For example, it is sometimes desirable to be able to use a cooling stack of the above type in an installation which already has a steam generator and in an installation which already has dust catchers and gas scrubbers, so that while it is still highly desirable to reduce the temperature of the waste gases so as to provide for the most efficient treatment thereof in the dust catchers and scrubbers, nevertheless there is no need for generation of steam at the cooling stack. Furthermore, there are conditions where at certain times no steam will be required while at other times it may be highly desirable to obtain steam from the cooling stack.

Summary of the invention

It is accordingly a primary object of the present invention to provide a cooling stack of the above general type which, however, can be controlled in such a way that steam can be generated thereby, to be used when steam is desired, or only liquid is circulated through the stack walls in the event that no steam is desired. For example, when the cooling stack is to be used in an installation which is already provided with a steam-generating plant, then the cooling unit itself need not be used to generate steam. Under such conditions the structure of the invention will operate to circulate water through the water-tube walls of the cooling stack. On the other hand, it may be that in the winter time certain economies can be achieved by using steam which can be generated at the cooling stack for heating purposes while such steam would not be required in the summer time, and thus with the present invention it becomes possible to provide controls which will achieve these latter results.

Thus, it is a more specific object of the present invention to provide for a cooling stack a control structure capable of controlling the liquid-gas ratio of a fluid circulated through the water-tube walls of the stack in such a way that this ratio can range from complete condensation of steam, into liquid, so that no steam is taken, to no condensation of the liquid in the event that a maximum amount of steam is to be generated.

Yet another object of the present invention is to provide an installation of the above type which can be used in existing plants with minimum modification thereof.

Also, it is an object of the present invention to provide a structure which will achieve the above objects while utilizing only simple rugged elements and while achieving a wide range of controls in a precise manner and at minimum cost.

Thus, in accordance with the invention the cooling stack has water-tube walls provided with an inner surface directed toward the interior of the stack to be engaged by the hot waste gases therein and an outer surface directed away from the interior of the stack. A control means of the invention coacts with this outer surface to control the liquid-gas ratio of the fluid which is circulated through the water-tube walls of the stack.

*Description of preferred embodiments*

Figure 1:
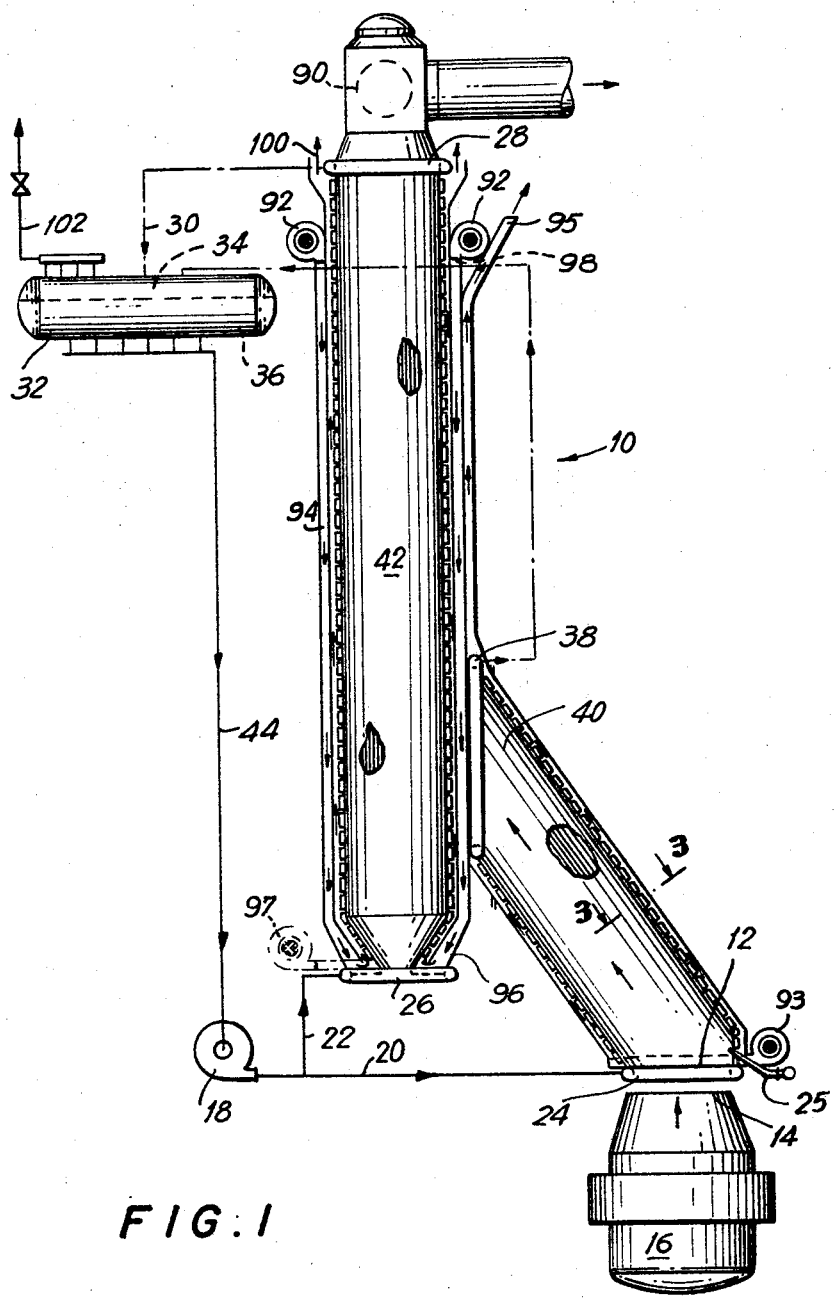
FIG. 1 is a schematic side elevation of one possible structure according to the invention, part of the fluid circuit of FIG. 1 being diagrammatically indicated.

Referring now to FIG. 1, there is shown therein a cooling stack 10 composed of water-tube walls through which water is circulated in a manner described below. The bottom inlet end 12 of the cooling stack is situated directly over the mouth 14 of the schematically indicated BOF converter 16. Various units such as an oxygen lance, a slag catcher, and the like are not illustrated since they do not form part of the present invention.

The water-tube walls of the stack 10 are composed of a plurality of tubes welded together in a manner described in greater detail below and through which a fluid is circulated by a circulating means shown in FIG. 1.

This circulating means includes the schematically indicated circulating pump 18 which directs a fluid such as hot water along tubes 20 and 22 into suitable headers 24 and 26, respectively, so that from these headers the liquid will flow upwardly along the interiors of the tubes of the walls of the stack, the fluid reaching the upper header 28 from which it flows along a pipe 30 into a drum 32 which has at its upper part steam 34 and at its lower part hot water 36. Part of the fluid which is delivered to the drum is derived from the header 38 at the upper end of the inclined portion 40 of the stack 10, this inclined portion 40 of the stack having the lower mouth 12 and communicating at its upper end with the vertical portion 42 of the stack.

Thus, fluid in the liquid and gaseous phase will be delivered to the drum 32, and the liquid will be drawn from the drum by way of a conduit or tube 44 into the inlet of the pump 18 which will again recirculate the fluid in the above manner.

The fluid within the tubes of the water-tube walls of the stack 10 has its liquid-gas ratio controlled by the invention through a control means which includes the structure described below.

Figure 3:
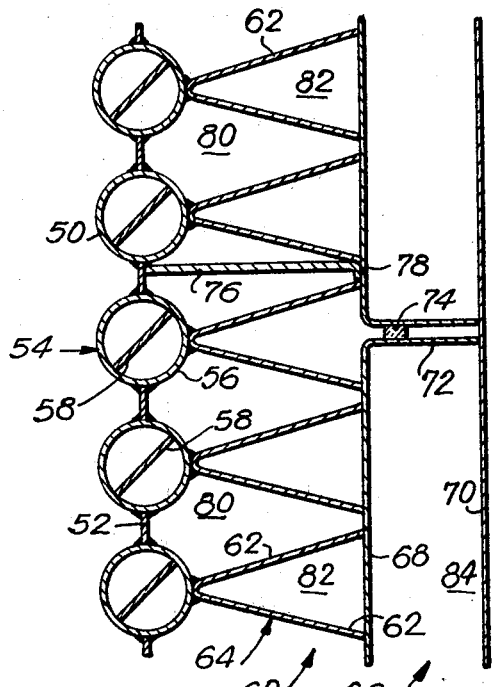
FIG. 3 is a fragmentary sectional plan view of the structure of FIG. 1 taken along line 3—3 of FIG. 1 in the direction of the arrows and showing the structure at a scale considerably enlarged, as compared to FIG. 1.

As may be seen from FIG. 3, the water-tube walls of the cooling stack 10, which is of square or rectangular cross section, are composed of a plurality of tubes 50 made of any suitable metal and welded to each other with the interposition of suitable strips 52 between the welded tubes 50. The tubes 50 may have a diameter on the order of 2 inches, for example. These tubes 50 provide the walls of the cooling stack with an inner surface 54 which is directed toward the interior of the stack so as to be directly engaged by the gases therein and with an exterior surface 56 which is directed outwardly away from the interior of the stack.

Situated within the tubes 50 are spirally twisted sheet-metal strips 58 which serve to direct steam which forms in the region of the inner surface 54 of the water-tube walls of the stack outwardly to the region of the exterior surface 56 thereof so as to come into communication with the cooler exterior temperature and thus be condensed at the outer surface region 58 of the stack walls.

The control means for controlling the liquid-gas ratio of the fluid within the tubes 50 includes the fins 60 which are indicated in FIG. 3. These fins in the illustrated example are in the form elongated channels of V-shaped cross section having opposed side walls 62 which converge toward each other in the region of the outer surface 56 and which intersect each other at the exterior surface 56 where these walls 62 are joined directly to the tubes 50 as by being welded thereto. A V-shaped channel 64 is fixed to each tube 50 and extends longitudinally therealong at the exterior surface thereof, as indicated in FIG. 3.

At their outer edges the channels 64 are fixed with a wall structure 66 which is hollow and which has a plurality of inner flat walls 68 directly joined to the outer edges of the channels 64 and outer flat walls 70 which define with the walls 68 the hollow interiors of the wall structures 66. The inner walls 68 terminate at their adjoining ends in outwardly directed flanges 72 joined to the outer wall 70 and separated from each other as by strips of asbestos insulation 74. In addition support members such as strips 76 are fixed at their inner edges to strips 52 which are situated between the welded tubes 50 and at their outer edges are provided with flanges 78, as shown for the reinforcing strip 76 in FIG. 3, which are directly joined to the inner surface of an inner wall 68 of the wall structure 66.

Thus, with this construction there will be provided at the exterior of the water-tube walls of the stack passages 80 defined by the exterior surfaces 56 of the walls and the exterior surfaces of the channel walls 62, passages 82 defined by the interiors of the channels 64, and passages 84 defined by the hollow interior of the wall structure 66. All of these passages 80, 82 and 84 extend longitudinally along the stack walls and have open top ends and open bottom ends, so that by directing cooling air longitudinally through these passages it is possible to control the extent to which steam in the tubes 50 is condensed, and thus it becomes possible to control the liquid-gas ratio of fluid within the tubes 50.

Figure 2:
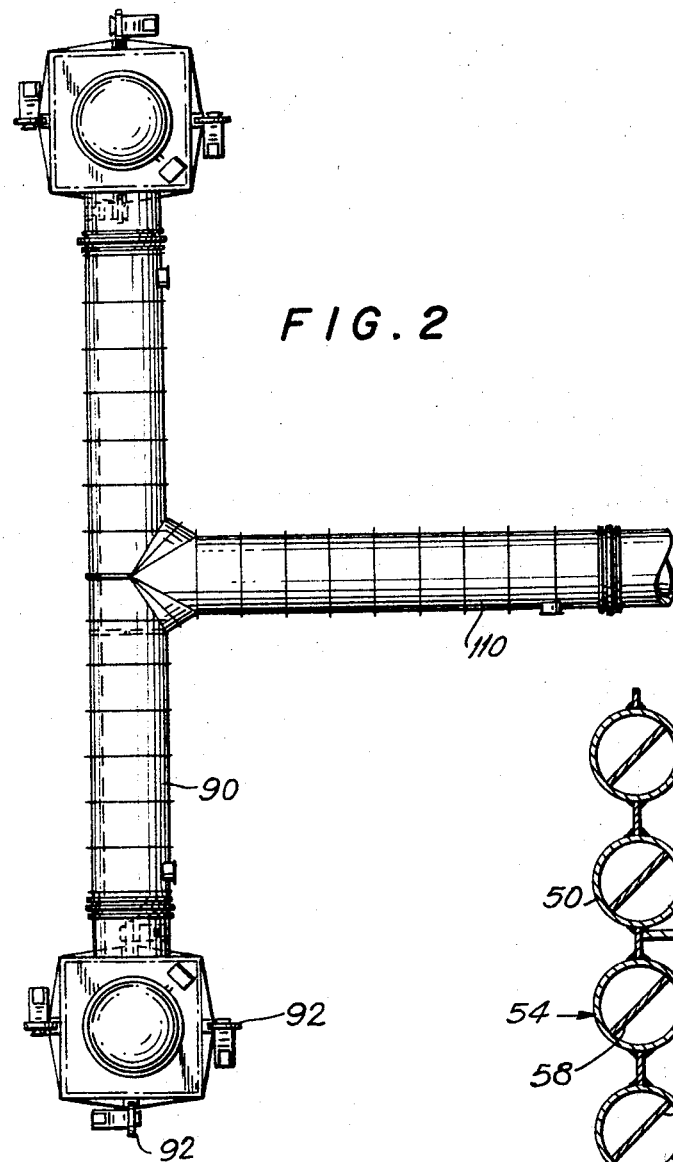
FIG. 2 is a top plan view of the arrangement of FIG. 1.

For this latter purpose there are situated at the region of the top end of the stack, where it communicates with a waste gas duct 90 (FIG. 2), a plurality of blowers 92 respectively driven by electric motors, as schematically indicated in FIG. 2. As may be seen from FIG. 1, the outlets of the centrifugal blowers 92 communicate with conduits 94 leading to headers 96 which in turn communicate with the lower ends of the passages 80, 82 and 84, and the outlets of the blowers 92 are respectively provided with adjustable valves 98 so that the flow of cooling air through the passages 80, 82 and 84 can be regulated. These valves 98 may take the form of simple butterfly valves or dampers capable of being placed in any suitable angular position either manually or through suitable remote controls.

Thus, with this construction assuming that the valves 98 are in their fully open position and that all of the blowers 92 are operating, a maximum amount of cooling air, taken from the ambient atmosphere, is driven upwardly along the passages 80, 82, 84, to issue from the open top ends thereof, as indicated by the arrows 100 in FIG. 1. At this time substantially all of the steam which forms within the tubes 50 is condensed so that the drum 32 has very little steam 34 available for other uses, and there is practically a continuous circulation of hot water 36 throughout the system with substantially no generation of any steam which is available for other purposes.

On the other hand, it is possible either to displace the valves 98 to their closed positions or simply to stop the operation of the blowers 92, in which case practically all of the liquid in the tubes 50 is converted into steam, so that at this time a large amount of steam is available at the drum 32, to be taken off from the latter by way of the conduit 102, and to be used for any desired purpose.

Furthermore, where only part of the steam-generating capacity of the unit is required, it is possible to set the valves 98 at intermediate positions so as to control the liquid-gas ratio to provide a value between the extremes of all liquid or all gas, and thus it is possible to regulate the extent of condensation within the tubes 50 to take off from the drum 32 the required amount of steam.

A separate motor driven and valve controlled blower 93 communicates through a suitable header with passages 80, 82, 84 of inclined stack portion 40, the latter passages having their own outlet 95. Also an additional blower 97 may communicate with header 96, if desired. FIG. 1 also shows secondary air nozzles 25. Instead of using valves 98, variable speed motors may drive the blowers at different speeds in a given range to provide results similar to those achieved by way of the adjustable valve 98.

As may be seen from FIG. 2, a pair of structures as described above and shown in FIG. 1 communicate with a common waste-gas duct 90. The waste gas duct 90 in turn communicates with a duct 110 which delivers the waste gases to the scrubbers, dust catchers, and the like.

Thus, with the above described structure while the gases will be reliably cooled so as to be in the best possible condition when received by the scrubbers, dust catchers, and the like, at the same time it is possible to provide with the structure of the invention either no steam or a maximum amount of steam to be used as desired.

Figures 4, 5, 6:
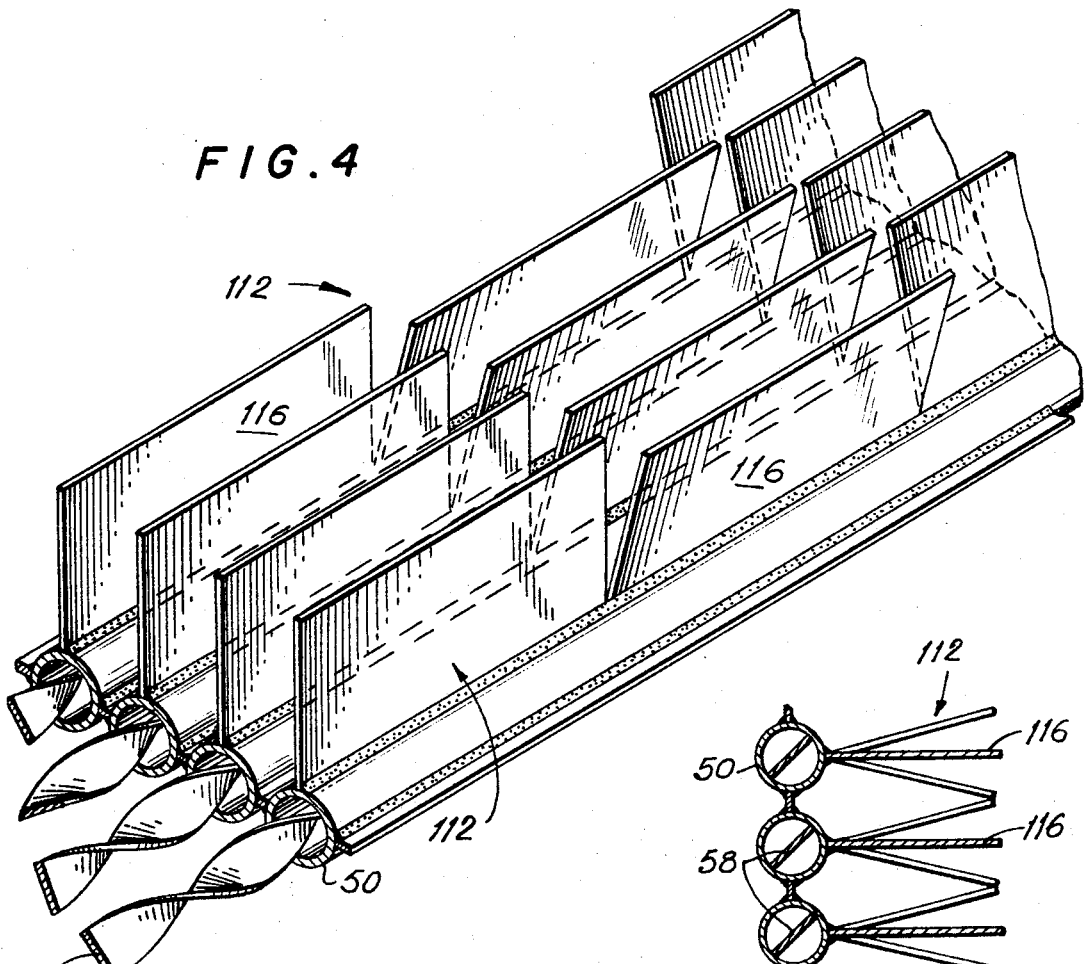
FIG. 4 is a fragmentary perspective illustration of another embodiment of a control structure according to the invention.
FIG. 5 is a side view of the structure of FIG. 4.
FIG. 6 is a transverse view of the structure of FIG. 4 showing more precisely the angular relationships between cooling fins thereof.

The control means described above need not necessarily have the fin structure and hollow wall structure 66 shown in FIG. 3. Thus, as is shown in FIGS. 4–6, according to this embodiment the very same tubes 50 which form the water-tube walls of the stack and which have the spiral strips 58 therein, as shown in FIG. 4, have fixed to their exterior surfaces and extending longitudinally therealong simple elongated plates 112 which are formed with transverse slits 114, as shown in FIG. 5, so that each plate 112 is divided by the slits 114 into a plurality of successive plate portions 116. These successive plate portions 116 are then bent, at the inner ends of the slits 114 where these slits terminate short of the tubes 50, so that the successive plate portions 116 extend at different angles one with respect to the other and an arrangement is shown in FIGS. 4–6 where the first, second and third successive plate portions respectively extend at different angles, as shown particularly in FIGS. 4 and 6. Then these angles can be repeated. If desired, however, the successive plate portions 116 can be bent equally and oppositely with respect to a central median plane so that every other plate portion 116 is located in one plane while the remaining plates 116 are located in another plane, and in this way the plate portions will form parts of a pair of walls of a V-shaped channel similar to those shown in FIG. 3.

In any event, the several plates 112 have their portions 116 situated respectively at the same elevations so that at any given elevation an entire horizontally extending series of plate portions 116 are all deflected at the same angle, as is particularly apparent from FIG. 4.

With this construction the fins 112 will also define elongated passages through which the cooling air is blown by the blowers, as described above, in order to condense the steam within the tubes 50 to a preselected extent.

Thus, with the structure of the present invention it becomes possible to introduce units as described above for cooling the waste gases, and where the unit is used with an installation which already has its own steam generator, the structure can be adjusted so that it does not generate any steam, unless steam is desired for any purpose such as heating in the winter, operating turbines of subsidiary plants, or the like.

What is claimed is:

1. Waste-gas treating apparatus, comprising a cooling stack for receiving waste gases, said stack being composed of welded water-tube walls having an inner surface directed toward the interior of the stack and an outer surface directed away from the interior of the stack, circulating means communicating with said water-tube walls for circulating fluid therethrough, and control means coacting with the outer surface of said walls for controlling the liquid-gas ratio of the fluid.

2. The combination of claim 1 and wherein said control means includes a plurality of fins fixed to and projecting from said walls at said outer surface thereof and blowers communicating with the spaces between said fins for directing cooling air therealong, so that according to the extent to which cooling air is directed along said fins by said blowers the liquid-gas ratio of the fluid in said walls can be controlled.

3. The combination of claim 2 and wherein said water-tube walls include a plurality of tubes respectively having spiral-shaped strips situated therein and extending longitudinally therealong for directing fluid which is vaporized into a gaseous state at the region of the inner surface of said walls outwardly to the region of said outer surface of said walls to be condensed at said outer surface.

4. The combination of claim 2 and wherein said walls are composed of tubes extending longitudinally of said walls and said fins are composed of elongated channels of substantially V-shaped cross section each having a pair of oppositely inclined side walls which converge toward and intersect each other along an edge of said channel, and said channels being fixed at said edges thereof respectively to and extending longitudinally along said tubes at said exterior surface thereof, so that said side walls of each channel diverge from the tube to which the channel is fixed, said blowers directing cooling air along the interiors of said channels and longitudinally between said channels in engagement with said outer surface of said walls.

5. The combination of claim 4 and wherein an outer hollow wall structure is fixed to said channels at the edges of said side walls thereof distant from said tubes for closing the spaces in said channels and between said channels and for guiding cooling air along the hollow interior of said wall structure.

6. The combination of claim 5 and wherein said wall structure includes an inner flat wall fixed directly to said channels and an outer flat wall spaced from and parallel to said inner wall to define therewith the hollow interior of said wall structure through which cooling air flows.

7. The combination of claim 2 and wherein said water-tube walls include a plurality of tubes and said fins include a plurality of elongated plates respectively having inner edges fixed to and extending longitudinally of said tubes at said outer surface of said walls, said plates respectively having outer edges distant from said tubes and respectively being formed with transverse slits extending inwardly across said plates from said outer edges thereof toward said tubes, said slits defining between themselves a plurality of plate portions distributed along each plate, and each plate portion being angularly displaced with respect to the next-preceding and the next-following plate portion of each plate.

8. The combination of claim 7 and wherein the plate portions of all of said plates are longitudinally aligned with each other and those plate portions of the several plates which are at the same elevation extending at the same angles from said tubes, respectively.

9. The combination of claim 8 and wherein first, second, and third consecutive plate portions of each plate respectively are situated in three different planes.

10. The combination of claim 2 and wherein said blowers direct cooling air upwardly along said stack.

References Cited

UNITED STATES PATENTS 714,450  11/1902  Carson _____ 122—7 XR
3,212,476  10/1965  Markow et al. _____ 122—7

KENNETH W. SPRAGUE, *Primary Examiner.*